US008253996B2

(12) United States Patent
Martinez et al.

(10) Patent No.: US 8,253,996 B2
(45) Date of Patent: Aug. 28, 2012

(54) SYSTEM, COLOR IMAGE PRODUCING DEVICE, COLOR MEASUREMENT DEVICE AND COLOR MEASUREMENT METHOD

(75) Inventors: Oscar Martinez, Castelldefels (ES); Ignacio Ruiz-De-Conejo, Barcelona (ES); Jordi Arnabat Benedicto, Tarragona (ES); Jesus Lopez, Barcelona (ES); Jordi Ferran, Cerdanyola del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 993 days.

(21) Appl. No.: 12/248,327

(22) Filed: Oct. 9, 2008

(65) Prior Publication Data
US 2009/0237683 A1 Sep. 24, 2009

Related U.S. Application Data

(60) Provisional application No. 61/038,589, filed on Mar. 21, 2008.

(51) Int. Cl.
*H04N 1/04* (2006.01)
(52) U.S. Cl. ............................ 358/504; 358/1.8; 358/1.9
(58) Field of Classification Search .................. 358/504, 358/1.8, 1.9
See application file for complete search history.

(56) References Cited

U.S. PATENT DOCUMENTS

| 5,796,414 | A | 8/1998 | Sievert |
| 6,390,587 | B1 | 5/2002 | Subirada |
| 6,478,401 | B1 | 11/2002 | King |

FOREIGN PATENT DOCUMENTS

| EP | 1215887 | * 12/2001 |
| JP | 2002/323615 | 11/2002 |
| JP | 2003/334979 | 11/2003 |

* cited by examiner

*Primary Examiner* — Houshang Safaipour

(57) ABSTRACT

A system is disclosed comprising a color image producing device for providing a test pattern on a medium, said test pattern comprising a plurality of color patches, said test pattern having a principal orientation axis under a non-perpendicular angle α with the propagation direction of the medium through said color image producing device; and a color measurement device coupled to receive the medium from the color image producing device and arranged to propagate the medium in said propagation direction, the color measurement device being further arranged to measure the colors of the respective patches of the medium during said propagation, the color measurement device comprising a color sensor mounted on the carriage oriented substantially perpendicularly to the propagation direction. The present application further discloses a color image producing device and a color measurement device that can be used in such a system, and a method for measuring colors with such a system.

21 Claims, 3 Drawing Sheets

SYSTEM, COLOR IMAGE PRODUCING DEVICE, COLOR MEASUREMENT DEVICE AND COLOR MEASUREMENT METHOD

CROSS-REFERENCE TO RELATED APPLICATION

This Utility patent application is based on and claims the benefit of U.S. Provisional Application No. 61/038,589, filed on Mar. 21, 2008 the contents of which are hereby incorporated by reference in their entirety.

Color management in printing devices is becoming more and more important since nowadays not only professional designers and illustrators but also average consumers wish to reproduce color as faithfully as possible by means of their printing devices. This development is, among others, the consequence of a rapidly increasing number of users taking pictures with digital cameras and printing the pictures, e.g. with their desktop color inkjet printers. An important point in terms of color management is that each color reproducing device has its own device-dependent color space by reference to which it records or reproduces colors.

For example, two color inkjet printers of two different manufacturers may operate in a CMYK-color space including the primaries cyan (C), magenta (M), yellow (Y) and black (K). If the same CMYK-values are sent to the different color printers, different colors will appear on the print medium.

In order to be able to compare CMYK-values of different color printing devices, the colors may be transformed into a device-independent color space, such as the CIE (Commission Internationale de l'Eclairage)-LAB-color space or the CIE-XYZ color space. Such a transformation may be achieved by measuring the printed color values in the LAB color space. These measured values may be used to determine a correlation function between the CMYK color values received by the printing device and the corresponding measured color values, which may be for instance be used to adjust the CMYK color values of an image to be printed to yield a printed image having colors that more accurately reflect the intended colors of the image. It will be appreciated that the above principle is not limited to devices using CMYK color production principles, but is applicable to any color output generating device, e.g. RGB printers and printers using larger number of individual colors.

A large number of printing devices have been disclosed which integrate a color measurement device, e.g. a calorimeter which uses filters that mimic human color perception, a densitometer, or a spectrophotometer which measures the wavelengths of the reflected light of color regions in the test pattern and calculates the corresponding LAB-color values, for this purpose. For instance, the background description of U.S. patent application 2007/291291 A1 recites a number of prior art printing devices comprising integrated color measurement devices. The application itself discloses a color printing device comprising a reciprocating color measurement device and a reciprocating optical density sensor, with the optical density sensor being arranged to identify the position of a test pattern on a two-dimensional media and the color measurement device being arranged to measure the color of the color region.

The printing devices may be arranged to print a test pattern comprising a plurality of color regions, i.e. patches, on a printing medium. The respective LAB-values of these patches may be measured with a color measurement device. For instance, US 2007/0070367 discloses a printing device arranged to print a test chart comprising a relatively small number of patches having predefined colors, to measure the individual patches and to extrapolate a color correction profile for the full color range of the device from the measured patches, thereby reducing the amount of printing medium required for the color calibration.

It is also known to use external color measurement devices. For instance, EP 1140192 A2 and U.S. Pat. No. 6,762,858 B2 each disclose a system comprising a printer and a color measurement device external to the printer.

Embodiments of the invention are described in more detail and by way of non-limiting examples with reference to the accompanying drawings, wherein FIG. 1 shows a system according to an embodiment of the present invention;

It should be understood that the Figures are merely schematic and are not drawn to scale. It should also be understood that the same reference numerals are used throughout the Figures to indicate the same or similar parts.

The term "medium" as used herein refers to any types of paper, such as glossy, semi-gloss or coated paper, different types of transparencies, cardboard, canvas, and any other substance on which a printer can print.

The term "ink" refers to dye ink, pigmented ink, toner, color-coated film for thermal printers or any other substance which can be applied to a print medium.

The term "color image producing device" as used herein refers to any sorts of inkjet printers, printing presses, color laser-jet printers, thermal printers or any other devices which are able to print color on a print medium. The color image producing device may be arranged to print a variety of different colors defined by respective color codes. The inks are, for example, CMYK; thus, the color codes are expressed in the (device-dependent) CMYK color space. There are also color image producing devices using more than four inks, some of which additionally provide a light cyan and a light magenta, thereby operating in a CMYKcm color space, and color image producing devices equipped with inks of the four subtractive primary colors plus orange and green inks. Such devices refer to a CMYKOG color space, whereas still other devices may operate in a CMYKcmOG color space. Alternatively, the color image producing device may operate in a RGB color space. Other suitable alternatives will be apparent to the skilled practitioner.

In some of the embodiments, a "color measurement device" or ☐color sensor☐ comprises a calorimeter, a densitometer or a spectrophotometer. Colorimeters directly measure colorimetric values by suitable color filters that mimic the human cone response, and produce numerical results in a color space (e.g. CIE LAB) for a fixed given illuminant. Densitometers can be used to measure the degree of darkness, i.e. the optical density, of a photographic or printed surface. Densitometers typically comprise a light source aimed at a photoelectric cell which determines the density of the sample from differences in the readings. Spectrophotometers measure the spectral power distribution (SPD) across the entire spectrum relative to the light source used, and process the data representing the measured spectrum in function of the illuminant such that the response to the spectrum by the cones in our eyes is simulated, and again output numerical results in a color space, as well as the SPD. Such types of color measurement devices are known to the skilled practitioner, and will not be discussed in further detail for reasons of brevity only.

Figure 1:
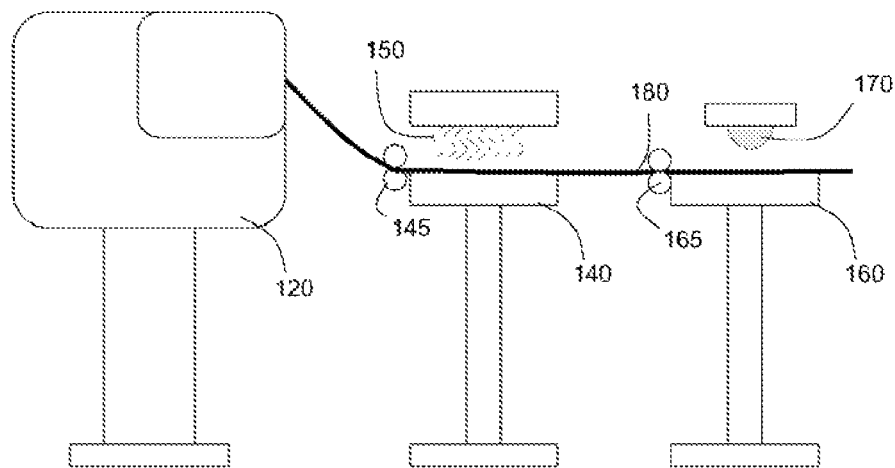

FIG. 1 schematically depicts a system 100 in accordance with an embodiment of the present invention. The system 100 comprises a color image producing device 120 and a color measurement device 160 comprising one or more color sensors 170 mounted on a carriage (not shown). The color measurement device 160 is a separate device external to the color image producing device 120. This has the advantage that soiling of the color sensor 170 by components of an ink deposited by the color image producing device 120 is significantly reduced compared with color image producing devices that comprise an integrated color measurement device.

However, it should be understood that in accordance with an alternative embodiment of the present invention, the color measurement device 160 may be integrated in the color printing device 120, e.g. by mounting the color sensors 170 on a carriage of the printing device 120. This carriage may be shared with other components of the printing device, e.g. printing cartridges.

The color measurement device 160 is arranged to propagate the medium 180 in the same direction as the color image producing device 120. To this end, the color measurement device 160 may comprise guide members 145 for guiding the medium 180 through the color measurement device 160 and for ensuring that the medium 180 is properly aligned with the color sensor 170. Since many suitable arrangements for guide members 165 are readily available to the skilled person, this will not be explained in further detail for reasons of brevity only. The propagation of the medium 180 through the color measurement device 160 may be driven by the color image producing device 120 or by the color measurement device 160.

In an embodiment, the system 100 further comprises a medium processing stage 140 between the color image producing device 120 and the color measurement device 160. The medium processing stage may comprise guide members 145 for guiding the medium 180 through the medium processing stage 140. The medium processing stage 140 is arranged to expose the medium to a stimulus 150 such as an air stream, which may be heated, or radiation, which may be UV-radiation, to dry or cure ink deposited on the medium 180. This has the advantage that exposure of the color sensor 170 in the color measurement device to the stimulus is at least reduced, and that the colors of an image such as a test pattern produced, e.g. printed on the medium 180 are as close as possible to their intended values, since wet or uncured inks may have a different color shade than their dried or cured counterparts.

In an embodiment, the system 100 is arranged to feed the medium 180 through the system 100 in a continuous manner, i.e. without disruptions. This is for instance advantageous in a system 100 designed to handle wide media types, e.g. a system 100 comprising a large format printer for printing media having a width of up to around 5 meters, where disruptions to the media transport through the system 100 are unwanted or unfeasible. However, since such a continuous media feed implies that the color measurement of the patches of a test pattern are performed without interruption, i.e. on the moving medium 180, thereby minimizing the time required for the color measurement, this embodiment is generally advantageous to any system 100.

Figure 2:
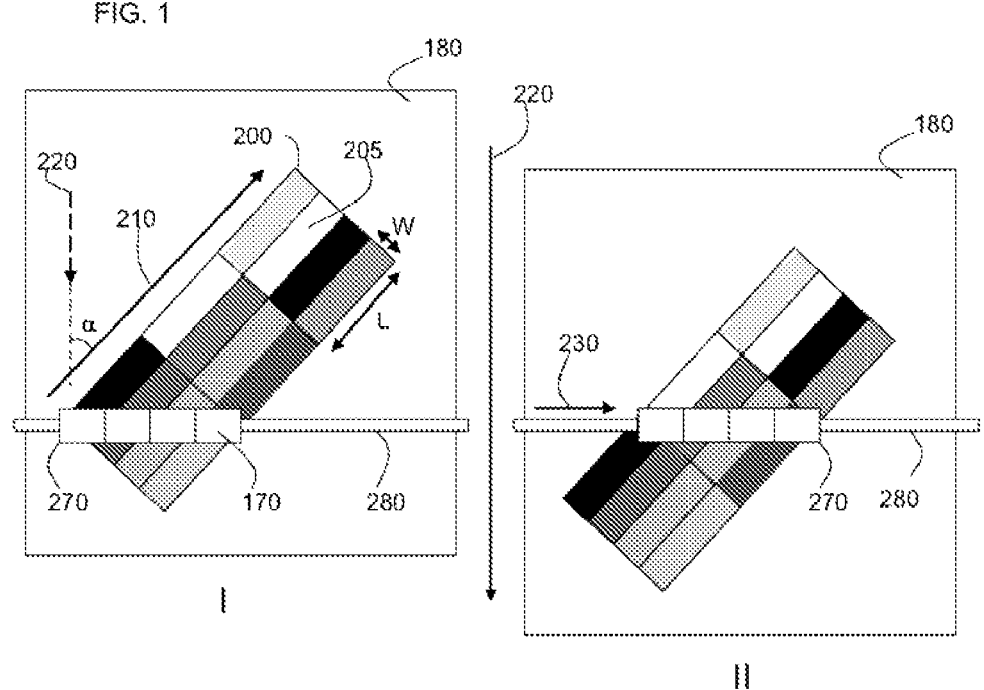
FIG. 2 shows a method of measuring colors according to an embodiment of the present invention.

FIG. 2 depicts an aspect of an embodiment of a color measurement method of the present invention, in which the color measurement device 160 is arranged to receive the medium 180, and to propagate the medium 180 in direction 220, which typically is the same direction in which the color image producing device 120 propagated the medium 180. The medium 180 carries a test pattern 200 comprising a plurality of patches 205, with each patch 205 typically comprising a different color. The test pattern 200 has been formed on the medium 180 by the color image producing device 120. In FIG. 2, the patches 205 of the test pattern 200 are in contact with each other by way of non-limiting example only. Other test patterns, e.g. a test pattern in which at least some of the patches 205 are separated from each other by means of an unprinted region, are equally feasible.

The color image producing device 120 is arranged to form the test pattern 200 on the medium such that the principal axis 210 of the test pattern 200, i.e. its orientation on the medium in respect of the propagation direction 220, forms a non-perpendicular angle α with the propagation direction 220. In FIG. 2, this angle is approximately 45°, indicating a diagonal orientation of the principal axis 210 with respect to the propagation direction 220. However, as will be explained in more detail later, the angle α may adopt other suitable values, dependent on the propagation speed of the medium, the color sensor translation speed and the dimensions of the patches of the test pattern.

In FIG. 2, the test pattern 200 has a row width of four patches 205 by way of non-limiting example only. Other row widths are equally feasible. The color measurement device 160 comprises a carriage 280 onto which an array 270 of color sensors 170 is mounted. The array 270 may be translated over the carriage in translation direction 230, which is substantially perpendicular to the medium propagation direction 220. In an embodiment, the array 270 typically comprises the same number of sensors 170 as the number of patches 205 defining the width of the test pattern 200, i.e. four color sensors 170 in FIG. 2.

Roman numeral I indicates a first orientation of the medium 180 in the color measurement device 160. The array 270 of color sensors 170 is located over the first row of color patches 205 such that each color sensor 170 is located over one of the color patches 205. By matching the propagation speed of the medium 180 through the color measurement device 160 with the translation speed of the array 270 of color sensors 170 on the carriage 280, the color sensors 170 can be kept located over the patches 205 to be measured. To this end, the patches 205 have a length L (and a width) that is sufficient to allow the color measurement device 160 to complete an integration of an individual color patch. The minimum length of a patch may be defined as L≧t*P, wherein t is the time required by the color measurement device 160 to perform an individual color measurement, and P is the propagation speed of the medium 180.

In a preferred embodiment, propagation of the medium 180, translation of the sensor array 270 and the color measurement of a row of patches 205 is performed simultaneously, i.e. the medium 180 and the sensor array 270 move continuously in a synchronized manner, such that after the color measurement device 160 has completed the color measurement of the first row of patches 205, the combined movement of the medium 180 and the sensor array 270 has positioned the color sensors 170 over the next row of color patches 205, as indicated by Roman numeral II. It is emphasized that the length L of the patches does not need to exactly match t*P. In case of L>t*P, the color measurement device 160 may be configured to start a new color measurement as soon as the color sensors 170 detect a change in color, thus indicating the arrival of a new row of patches 205 under the sensors 170.

In an alternative embodiment, the medium 180 is fed through the color measurement device 160 in a stepwise manner. In this embodiment, the feed of medium 180 may be stopped during a color measurement, e.g. in the position indicated by Roman numeral I, after which the medium 180 and the sensor array 270 may be advanced to the respective positions indicated by Roman numeral II, after which a next color measurement on the next row of patches 205 is performed.

The color measurement data retrieved from the test pattern 200 by the color measurement device 160 is typically used to generate color calibration information for the color image producing device 120, which enables the color image producing device 120 to improve the accuracy of its produced colors, e.g. by scaling the color coding such as CMYK coding using the calibration information. The generation of such color calibration information is well-documented in numerous prior art documents such as U.S. application No. 2007/2007/291291 A1 and is therefore not further discussed for reasons of brevity only.

The color measurement device 160 may comprise a processor (not shown) for generating the color calibration information. Alternatively, the system 100 may further comprise a separate processor, e.g. in a personal computer, coupled between the color measurement device 160 and the color image producing device 120, which is arranged to receive the color measurement data from the color measurement device 160, calculate the color calibration data from the received color measurement data and provide the color image producing device 120 with the color calibration data. Alternative arrangements for processing the color measurement data will be apparent to the skilled person.

By providing a test pattern 200 under a non-perpendicular angle with the propagation direction of the medium 180, and by providing an external color measurement device 160 having one or more sensors 170 such that the total width of the sensors 170, or sensor array 270, is substantially smaller than the total width of the medium 180, e.g. less than 50%, less than 25% or even less than 10% of the total width of the medium 180, a number of advantages are achieved.

For instance, the use of color sensors 170 on a carrier 270 has the advantage that the test pattern 200 can be formed on a shorter length of medium 180 than compared to a color measurement device 160 having fixed color sensors. In addition, by choosing a number of sensors that have a combined sensor width that is substantially smaller than the width of the medium 180, a cost efficient trade-off can be achieved between the complexity, i.e. cost, of the color measurement device 160 and the amount of medium 180 sacrificed for the formation of a test pattern 200. Moreover, the non-perpendicular orientation of the principal axis 210 of the test pattern 200 with respect to the propagation direction 220 of the medium 180 facilitates the measurement of a test pattern 200 on a continuously moving medium 180 by synchronizing the propagation of the medium 180 and the one or more sensors 170 on the carrier 270.

The color measurement device 160 may further be arranged to output configuration information including some of its operating parameters, such as a parameter V indicating the translation speed of the sensor array 270 over the carriage 280, and the integration time t. In an embodiment, the configuration information may further comprise the propagation speed P. This configuration information may be used to calculate the length l of the patches 205, as previously explained, and the orientation angle α of the test pattern 200. The orientation angle α is determined by the ratio of the propagation speed P and the translation speed V, i.e. $\tan(\alpha)=V/P$ when V and P are expressed in the same units. Hence, the dimensions and orientation of the test pattern 200 and the patches 205 may be dynamically determined based on the configuration information provided by the color measurement device 160. Alternatively, this configuration information may be used to alter the propagation speed P of the color image producing device 120.

In an embodiment, the color image producing device 120 comprises a processor arranged to receive the configuration information from the color measurement device 160 and determine the orientation and dimensions of the test pattern 200 and the patches 205 accordingly. In an alternative embodiment, the configuration information may be provided to a separate processing device, e.g. a PC coupled between the color image producing device 120 and the color measurement device 160.

Similarly, the color measurement device 160 may be configured to receive configuration information from the color image producing device 120, such as α, L and P, and adapt the translation speed V of the sensor array 270 over the carriage 280 accordingly. Alternatively, the configuration information from the color image producing device 120, such as α, L and P may be provided to an intermediate device, e.g. a PC, which calculates V accordingly and provides the color measurement device 160 with the calculated value for V. The intermediate device may comprise dedicated software, e.g. respective control software for the color image producing device 120 and the color measurement device 160 to perform the above calculations.

In an embodiment, the translation of the sensor array 270 may be driven by the color image producing device 120 or its control software when executed on a processor, e.g. of a PC. To this end, the sensor array may be presented to the color image producing device 120 or its control software as a single color sensor device. The system may further comprise a user interface where an operator of the system may specify one or more of the aforementioned configuration parameters. Such a user interface may for instance be embedded in the control software of the color image producing device 120 or the color measurement device 160. In an embodiment, the user interface enables the user to instruct the system 100 to perform a color calibration, color profiling or color adjustment operation, or combinations of these operations.

Figure 3:
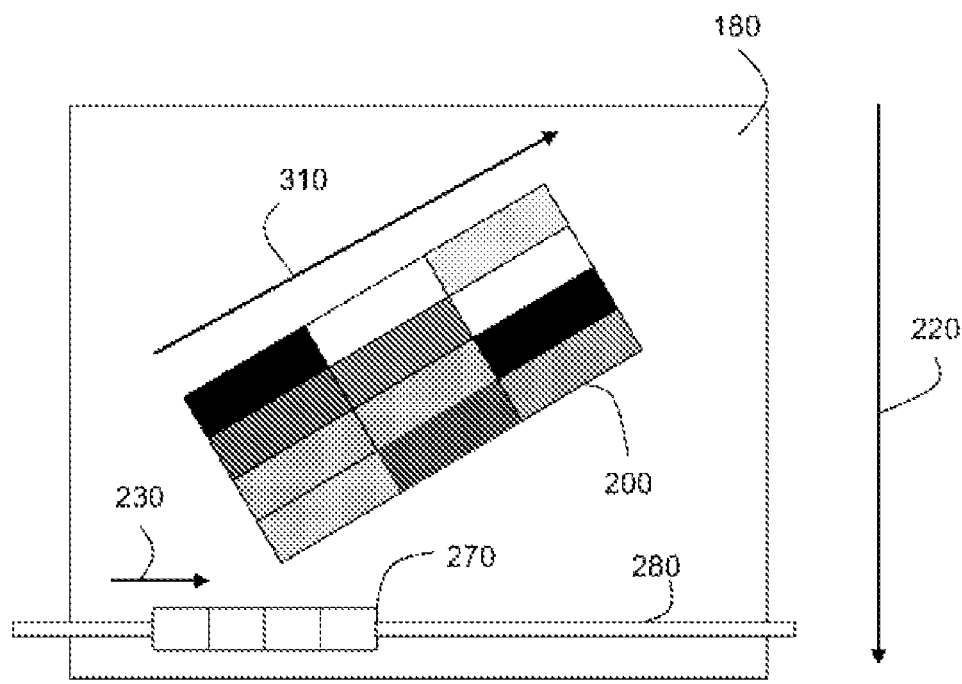
FIG. 3 shows a method of measuring colors according to another embodiment of the present invention.

FIG. 3 shows an embodiment of the present invention in which the ratio between translation speed V of the at least one sensor 170 on the carriage 280 and the propagation speed P of the medium 180 is larger than in the embodiment shown in FIG. 2. Consequently, the principal axis 310 of the test pattern 200 in FIG. 3 forms a larger angle α with the propagation direction 220 of the medium 180 compared to the angle α shown in FIG. 2. This further reduces the length of medium 180 that has to be sacrificed for providing a test pattern 200, and is particularly useful in case of a medium 180 having sufficient width for providing a more slanted test pattern 200.

Figure 4:
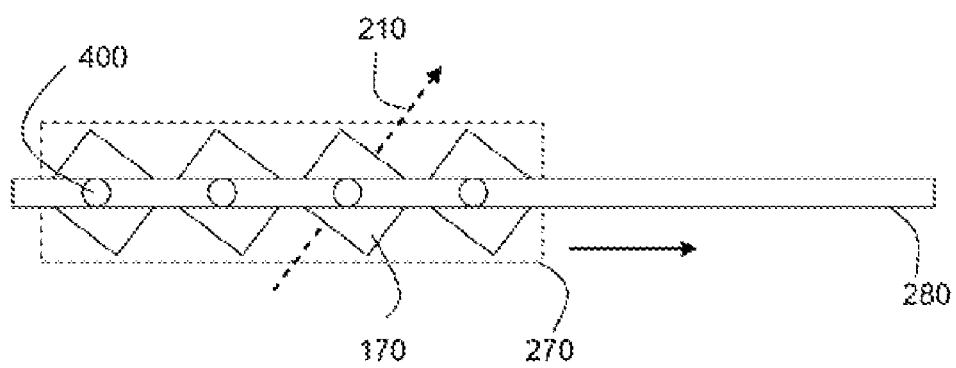
FIG. 4 shows an aspect of a color measurement device according to an embodiment of the present invention.

FIG. 4 shows an embodiment of the color sensor arrangement of the color measuring device 160. In this embodiment, the color sensors 170 are slanted with respect to the carriage 280 such that the respective apertures of the color sensors 170 are aligned substantially in parallel with the principal axis 210 of the test pattern 210. This is particularly advantageous for sensors 170 having a rectangular shape aperture, because it optimizes the orientation of the sensor aperture with respect to the patches 205 of the test pattern 200. In an embodiment, the slant angle of the sensors 170 is adjustable, e.g. in response to test pattern orientation information received from the color image producing device 120. To this end, the sensors 170 comprise an adjustment mechanism 400, which may be controlled manually or electronically.

Figure 5:
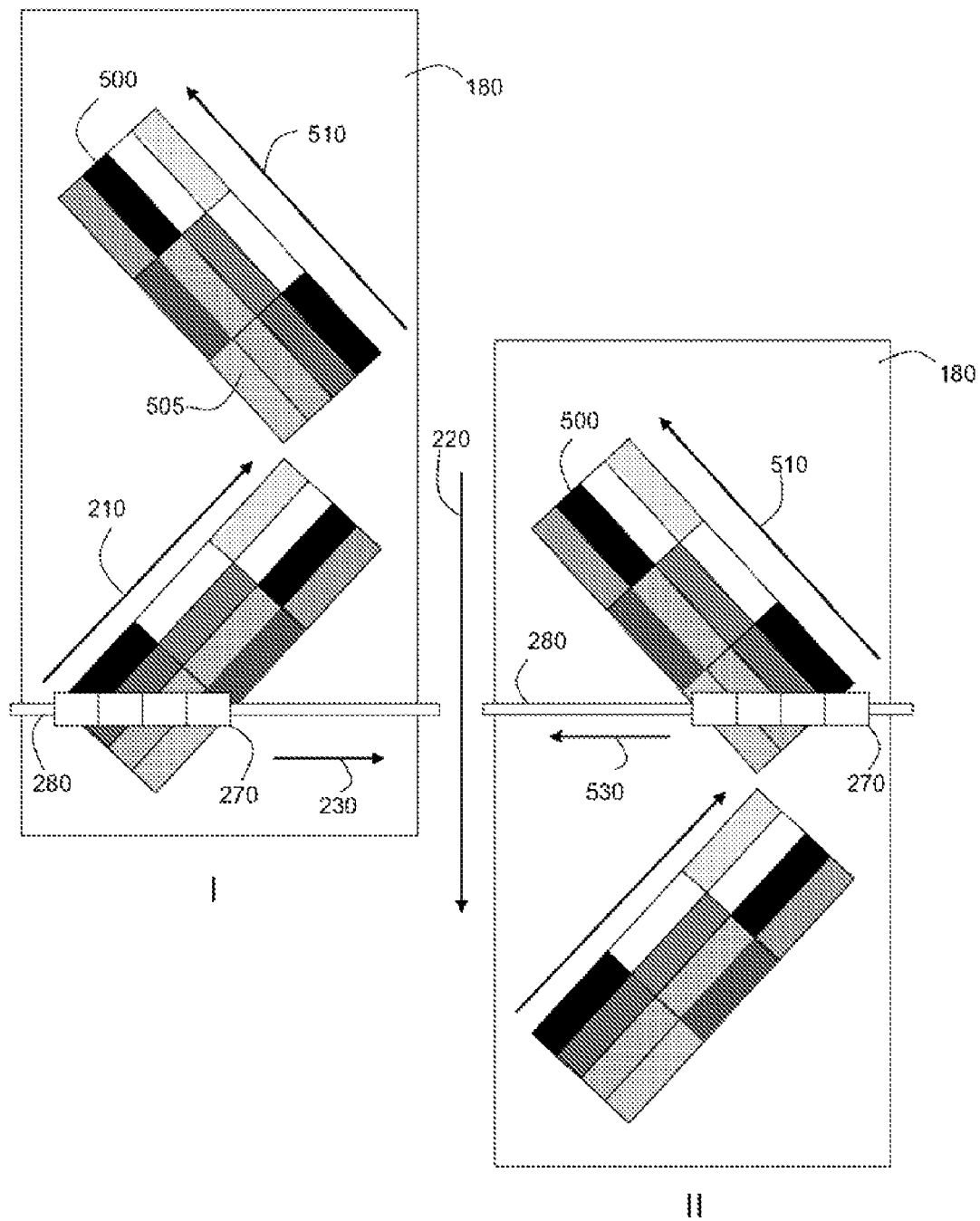
FIG. 5 shows a method of measuring colors according to yet another embodiment of the present invention.

In an embodiment, the medium 180 comprises more than one test pattern 200. For instance, FIG. 5 depicts a medium 180 having a first test pattern 200 and a second test pattern 500. The first test pattern 200 has color patches 205 a principal axis 210 and the second test pattern 500 has further color patches 505 and a further principal axis 510. In an embodiment, the orientation of the further principal axis 510 is a mirror-image of the orientation of further principal axis 210 with respect to the propagation direction 220 of the medium 180. As indicated by Roman numeral I, the sensor array 270 moves in direction 230 when measuring the colors of respective patches 205 of the first test pattern 200, and reverses its direction to direction 530 when measuring the colors of respective further patches 505 of the second test pattern 500, as indicated by Roman numeral II.

The medium 180 may propagate continuously through the color measurement device 160 during the respective color measurements or may be propagated intermittently, as previously explained. The orientation of the further principal axis 510 of the second test pattern 500 may not be a mirror image of the orientation of the principal axis 210 of the first test pattern 200, in which case the propagation speed P or the translation speed V may be adjusted accordingly following the color measurement of the first test pattern 200.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

We claim:

1. A system comprising:
   a color image producing device for providing an elongated test pattern on a medium, said test pattern comprising a plurality of color patches, and having a principal orientation axis parallel to a long dimension of the test pattern and under a non-perpendicular angle with the propagation direction of the medium through said color image producing device; and
   a color measurement device coupled to receive the medium from the color image producing device and arranged to propagate the medium in said propagation direction, the color measurement device comprising a color sensor mounted on a carriage oriented substantially perpendicularly to the propagation direction for measuring the colors of the respective patches during said propagation.

2. A system as claimed in claim 1, wherein said principal orientation axis is oriented substantially diagonally to the propagation direction.

3. A system as claimed in claim 1, wherein the color image producing device is arranged to define the orientation of the principal orientation axis based on at least one of the following parameters: media type, media propagation speed through the color measurement device and color sensor translation speed.

4. A system as claimed in claim 1, wherein the color measurement device comprises an array of color sensors, the width of said array being substantially smaller than the width of the medium.

5. A system as claimed in claim 1, further comprising a medium processing stage between the color image producing device and the color measurement device.

6. A system as claimed in claim 1, further comprising processing means coupled between the color sensor and the color image producing device, the processing means being arranged to:
   receive color information from the color sensor;
   derive the calibration information from the color information; and
   provide the color measurement device with the calibration information.

7. A system as claimed in claim 6, wherein the processing means are integrated in the color measurement device.

8. A color image producing device arranged to provide an elongated test pattern on a medium, said test pattern comprising a plurality of color patches and having a principal orientation axis parallel to a long dimension of the test pattern and under a non-perpendicular angle with the propagation direction of the medium through said color image producing device.

9. A color image producing device as claimed in claim 8, being further arranged to adjust its color image producing settings in response to color measurement information derived from said test pattern.

10. A color image producing device as claimed in claim 8, wherein the principal orientation axis is oriented substantially diagonally to the propagation direction.

11. A color image producing device arranged to provide a test pattern on a medium, said test pattern comprising a plurality of color patches and having a principal orientation under a non-perpendicular angle with the propagation direction of the medium through said color image producing device, the color image producing device further comprising an input for receiving color measurement device configuration information, and being arranged to determine the angle in response to the received color measurement device configuration information.

12. A color image producing device as claimed in claim 8, further comprising a color measurement device mounted on a carriage, the translation axis of the color measurement device on said carriage being oriented perpendicularly to said propagation direction.

13. A color measurement device for receiving a medium from a color image producing device, the color measurement device comprising an array of color sensors mounted on a carriage, the width of said array being substantially smaller than the width of the medium, and being arranged to:
   propagate the medium in the same direction as the medium propagation direction of the color image producing device; and
   measure the colors of respective patches of a test pattern on the medium during said propagation, the test pattern having a principal orientation axis under a non-perpendicular angle with the propagation direction, the translation axis of the color sensor on said carriage forming a substantially perpendicular angle with the propagation direction.

14. A color measurement device as claimed in claim 13, wherein the color sensors are slanted with respect to the translation direction, such that the color sensors are arranged substantially in parallel with the principal orientation axis.

15. A color measurement device as claimed in claim 14, wherein the slant angle of the color sensors is configurable.

16. A color measurement device as claimed in claim 13, further arranged to derive color calibration information from the measured colors, and to provide the color image producing device with said color calibration information.

17. A method for measuring colors produced by a color image producing device with a color measurement device comprising a color sensor on a carriage, the method comprising:
providing an elongated test pattern on a medium with the color image producing device, the test pattern comprising a plurality of color patches, and having a principal orientation axis parallel to a long dimension of the test pattern and under a non-perpendicular angle with the propagation direction of the medium through said color image producing device, the translation direction of the color sensor on said carriage forming a substantially perpendicular angle with the propagation direction;
measuring the color of a first patch with the color measurement device;
propagating the medium in the propagation direction;
migrating the color sensor in the translation direction; and
measuring the color of a second patch with the color measurement device.

18. A method as claimed in claim 17, wherein a measuring step, a propagation step and a migration step are performed simultaneously.

19. A method as claimed in claim 17, further comprising:
deriving color calibration information from the measured colors; and
adjusting the color producing settings of the color image producing device based on the color calibration information.

20. A system as claimed in claim 1, wherein the test pattern is substantially rectangular, and wherein the principal orientation axis is parallel to a long edge of the test pattern.

21. A color image producing device as claimed in claim 8, wherein the test pattern is substantially rectangular, and wherein the principal orientation axis is parallel to a long edge of the test pattern.

* * * * *